(12) United States Patent
Kang

(10) Patent No.: US 7,547,588 B2
(45) Date of Patent: Jun. 16, 2009

(54) THIN FILM TRANSISTOR ARRAY PANEL

(75) Inventor: Seung-Jae Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 379 days.

(21) Appl. No.: 10/564,820

(22) PCT Filed: Jul. 14, 2004

(86) PCT No.: PCT/KR2004/001747

§ 371 (c)(1),
(2), (4) Date: Jan. 13, 2006

(87) PCT Pub. No.: WO2005/006069

PCT Pub. Date: Jan. 20, 2005

(65) Prior Publication Data

US 2006/0197085 A1  Sep. 7, 2006

(30) Foreign Application Priority Data

Jul. 14, 2003  (KR) .................. 10-2003-0047756

(51) Int. Cl.
*H01L 21/00* (2006.01)
*H01L 21/84* (2006.01)

(52) U.S. Cl. .............. 438/149; 438/158; 349/141; 257/E21.414

(58) Field of Classification Search ............. 257/72, 257/98; 438/149
See application file for complete search history.

(56) References Cited

U.S. PATENT DOCUMENTS

| 2003/0133067 | A1* | 7/2003 | Park et al. ............. 349/141 |
| 2003/0136971 | A1* | 7/2003 | Rhee et al. ............ 257/98 |
| 2003/0168746 | A1* | 9/2003 | You .................... 257/759 |
| 2003/0234399 | A1* | 12/2003 | Jeon et al. ............. 257/72 |
| 2004/0072444 | A1* | 4/2004 | Park et al. ............. 438/710 |

(Continued)

FOREIGN PATENT DOCUMENTS

CN  1196803  10/1998

(Continued)

OTHER PUBLICATIONS

PCT International Search Report; PCT/KR2004/001747; Dated: Oct. 26, 2004.

(Continued)

*Primary Examiner*—Fernando L Toledo
(74) *Attorney, Agent, or Firm*—Cantor Colburn LLP

(57) ABSTRACT

A thin film transistor ("TFT") array panel is provided, which includes: first and second gate lines transmitting gate signals to adjacent pixel rows and disposed adjacent to each other; a data line insulated from the first and the second gate lines and the data line; a first thin film transistor connected to the first gate line and the data line and including a first drain electrode overlapping the second gate line; a second TFT connected to the second gate line and the data line, disposed opposite the first TFT with respect to the data line, and including a second drain electrode overlapping the first gate line; a first pixel electrode connected to the first drain electrode and overlapping the second gate line; and a second pixel electrode connected to the second electrode and overlapping the first gate line.

9 Claims, 24 Drawing Sheets

U.S. PATENT DOCUMENTS

2006/0097262 A1*  5/2006  Kim et al. ..................... 257/72
2006/0102903 A1*  5/2006  Kim et al. ..................... 257/72
2006/0146241 A1*  7/2006  Choi et al. ................... 349/129
2006/0152655 A1*  7/2006  Kim ............................ 349/110

FOREIGN PATENT DOCUMENTS

| CN | 1224887 | 8/1999 |
| CN | 1372242 | 10/2002 |
| JP | 6-11734 | 1/1994 |
| JP | 11-242244 | 9/1999 |

OTHER PUBLICATIONS

Written Opinion of the International Searching Authority of Corresponding PCT Application: PCT/KR2004/001747; Dated: Oct. 26, 2004.

* cited by examiner

THIN FILM TRANSISTOR ARRAY PANEL

FIELD OF THE INVENTION

The present invention relates to a thin film array panel.

BACKGROUND

The general structure of an LCD consists of a liquid crystal (LC) layer that is positioned between an upper panel provided with a common electrode and a lower panel provided with pixel electrodes. The molecular orientations of the LC layer is changed by an electric field that is generated by different voltages applied to the common electrode and the pixel electrodes such that the transmittance of light is adjusted to display desired images.

The lower panel includes gate lines (i.e., scanning lines), data lines (i.e., picture signal lines), thin film transistors (TFTs) provided at respective pixels and connected to the gate lines and the data lines, and pixel electrodes connected to the TFTs.

A passivation layer provided at the lower panel is made of organic material having low dielectric constant in order to increase aperture ratio of the LCD. For example, the aperture ratio is increased by forming an organic passivation layer between the pixel electrodes and the gate lines and the data lines and overlapping the pixel electrodes with the gate lines and the data lines.

However, the dose distance between the pixel electrodes and the data lines may make parasitic coupling that deteriorate image quality. In order to solve this problem, the coupling may be minimized by thickening the passivation layer.

However, the thick passivation layer requires wide contact holes and smooth sidewalls for obtaining reliability of contacts, which may decrease the aperture ratio.

In the meantime, a storage capacitor for providing storage capacitance of a pixel is formed in a previous gate type or in an independent wire type. The previous gate type forms the storage capacitor by expanding a portion of a gate line and by providing a conductor pattern connected to a pixel electrode and overlapping the expansion of the gate line. The independent wire type forms the storage capacitor by adding a signal wire extending parallel to the gate line and overlapping the signal wire with the pixel electrode.

However, the aperture ratio is decreased by the expansion of the gate line or by the additional signal line provided for obtaining sufficient storage capacitance.

DETAILED DESCRIPTION OF THE INVENTION

Technical Task

A technical task of the present invention is to provide a thin film transistor array panel having sufficient storage capacitance as well as securing aperture ratio for obtaining high luminance.

In detail, a thin film transistor ("TFT") array panel is provided, which includes: first and second gate lines transmitting gate signals to adjacent pixel rows and disposed adjacent to each other; a data line insulated from the first and the second gate lines and the data line; a first thin film transistor connected to the first gate line and the data line and including a first drain electrode overlapping the second gate line; a second TFT connected to the second gate line and the data line, disposed opposite the first TFT with respect to the data line, and including a second drain electrode overlapping the first gate line; a first pixel electrode connected to the first drain electrode and overlapping the second gate line; and a second pixel electrode connected to the second electrode and overlapping the first gate line.

The TFT array panel may further include red, green or blue color filters disposed in a pixel area defined by intersections of the first and the second gate lines and the data line.

The first and the second TFTs may include: first and second gate electrodes connected to the first and the second gate lines, respectively; first and second semiconductors overlapping the first and the second gate electrodes, respectively; and first and second source electrodes connected to the data line and overlapping the first and the second semiconductors, respectively.

The TFT array panel may further include a passivation layer interposed between the TFTs and the first and the second pixel electrodes and including organic insulator. It is preferable that the first pixel electrode does not overlap the first gate line, and the second pixel electrode does not overlap the second gate line.

The first and the second pixel electrodes preferably overlap the data line.

Advantage

As described above, when a gate line is supplied with a gate-on voltage, another gate line is supplied with a gate-off voltage to form a storage capacitor. As a result, sufficient storage capacitances are obtained without providing a separate storage electrode line or storage electrode such that there is no decrease in aperture ratio.

DETAILED DESCRIPTION OF EMBODIMENTS

Figure 1:
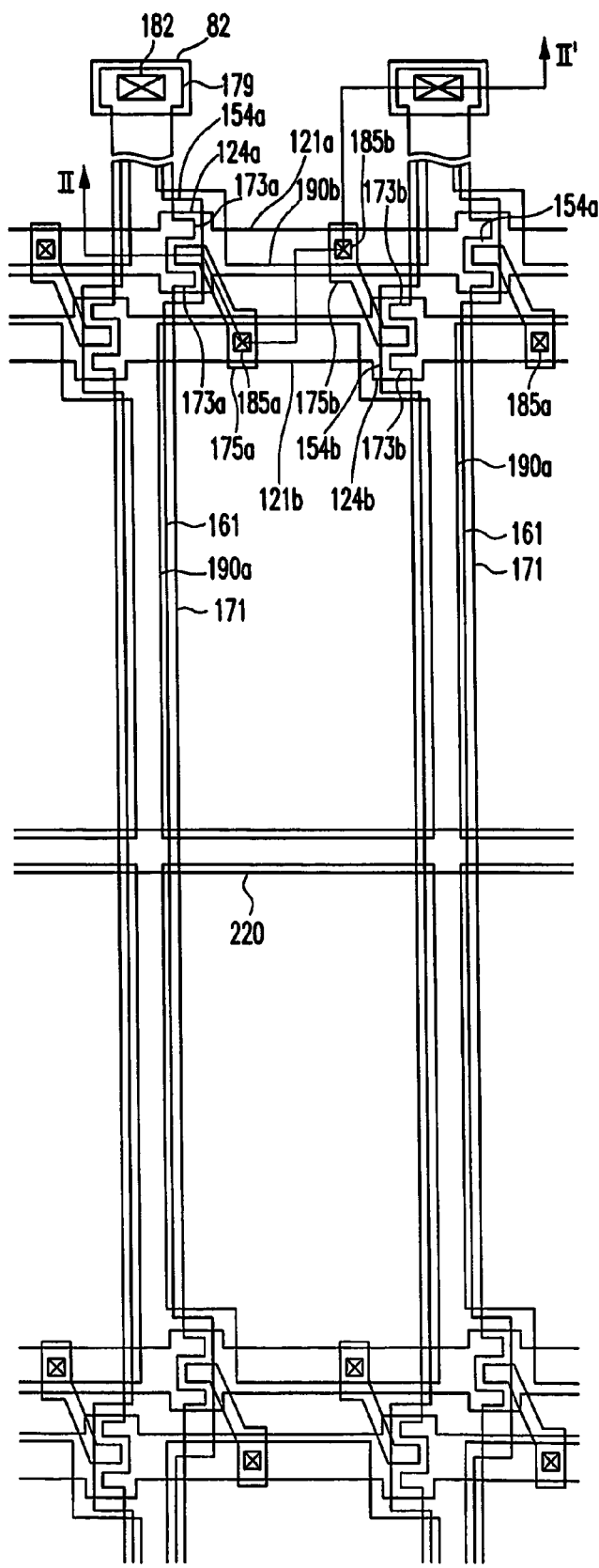
FIG. 1 is a layout view of a TFT array panel according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present In contrast, when an element is referred to as being "directly on" another element, there are no intervening elements present.

Now, TFT array panels and manufacturing methods thereof according to embodiments of the present invention will be described with reference to the accompanying drawings.

Figure 2:
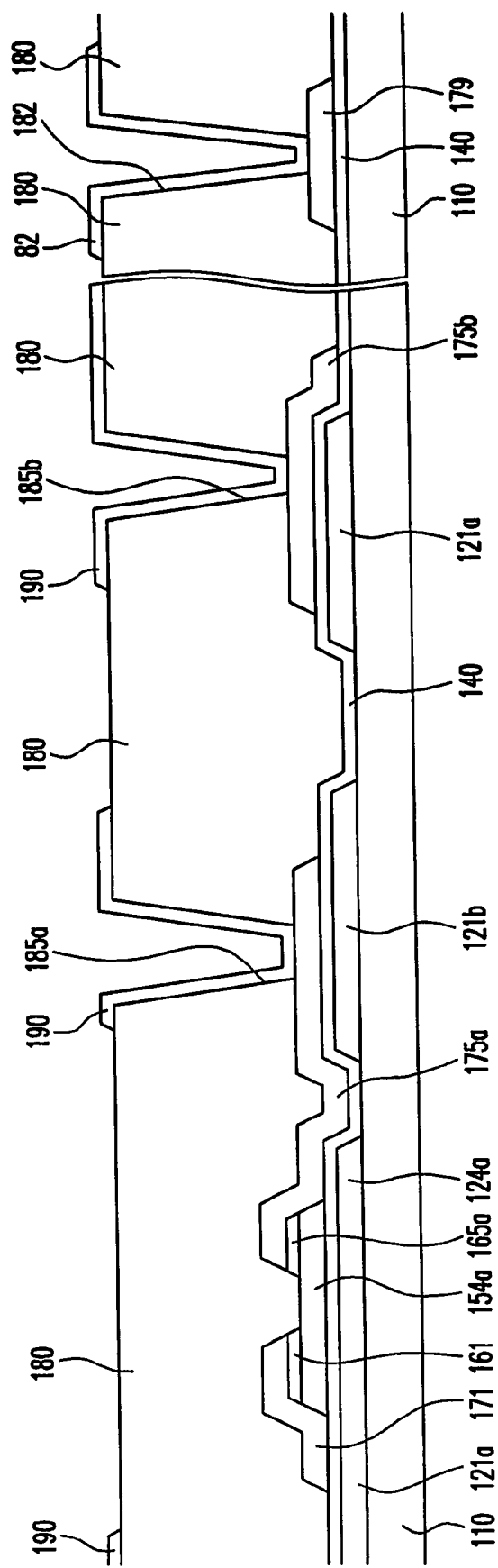
FIG. 2 is a sectional view of the TFT array panel shown in FIG. 1 taken along the line II-II'.

FIG. 1 is a layout view of a TFT array panel according to an embodiment of the present invention, and FIG. 2 is a sectional view of the TFT array panel shown in FIG. 1 taken along the line II-II'.

Referring to FIGS. 1 and 2, a structure of a TFT array panel for an LCD according to an embodiment of the present invention is described in detail.

In a TFT array panel according to an embodiment of the present invention, a plurality of first and second gate lines 121a and 121b elongated in a direction (a pixel column direction) and adjacent to each other are formed on a transparent insulating substrate 110.

Portions of the first and the second gate lines 121a and 121b form gate electrodes 124a and 124b of TFTs. Each of the first and the second gate lines 121a and 121b includes an end portion 129 having an increased width for receiving a signal from a gate driving circuit (not shown).

In addition, a plurality of light blocking members 220 are formed. The light blocking members 220 prevent light leakage near edges of the pixel electrodes 190a and 190b between the gate lines 121. Accordingly, the light blocking member 220 may be omitted when a black matrix (not shown) on the upper panel fully covers the light leakage.

The gate lines 121a and 121b, the gate electrodes 124a and 124b, and the light blocking member 220 preferably include a conductive film made of Al containing metal such as Al and Al alloy, and they may have a multi-layered structure further including another conductive film preferably made of material such as Cr, Ti, Ta, Mo and alloys thereof (e.g., MoW alloy), which has good physical, chemical, and electrical contact characteristics with other materials such as indium tin oxide (ITO) or indium zinc oxide (IZO). An example of the combination of the two films is Cr and Al—Nd alloy. An Al containing conductive film of double layers is preferably disposed under another film.

In addition, the lateral sides of the gate lines 121a and 121b and the storage electrode lines 131 are inclined, and the inclination angle thereof ranges about 30-80 degrees relative to a surface of the substrate 110.

A gate insulating layer 140 preferably made of silicon nitride (SiNx) or silicon oxide is formed on the gate lines 121a and 121b and the light blocking members 220.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124a and 124b. The width of each semiconductor stripe 151 may become large near the gate lines 121a and 121b such that the semiconductor stripe 151 covers large areas of the gate lines 121a and 121b. A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections, and the projections and the ohmic contact islands 165 are located in pairs on the projections 154 of the semiconductor stripes 151. The lateral sides of the semiconductor stripes 151 and the ohmic contacts 161 and 165 are inclined relative to a surface of the substrate 110, and the inclination angles thereof are preferably in a range between about 30-80 degrees.

The ohmic contact islands 165 are spaced apart from the ohmic contact stripes 161, and they have the same planar shape except for some portions of the semiconductor 154, which form channels of TFTs.

A plurality of data lines 171 intersecting the gate lines 121a and 121b to form pixel areas are formed on the ohmic contacts 161 and 165 and the gate insulating layer 140. The data lines 171 include first and second source electrodes 173a and 173b branched therefrom and overlapping the semiconductor stripes 151 of the TFT. The first and the second source electrodes 173a and 173b are disposed opposite each other with respect to the data lines 171. The first source electrodes 173a overlap the first gate electrodes 124a, and the second source electrodes 173b overlap the second gate electrodes 124b.

Each data line 171 includes an end portion 179 having an increased width for receiving signals from a data driving circuit (not shown).

A plurality of first and second drain electrodes 175a and 175b are formed on the ohmic contact islands 165. The drain electrodes 175a and 175b are disposed opposite the source electrodes 173a and 173b with respect to the gate electrodes 124a and 124b. The drain electrodes 175a and 175b are spaced apart from the source electrodes 173a and 173b and partly overlap the semiconductor 154. The first drain electrodes 175a overlap the first gate electrodes 124a, and the second drain electrodes 175b overlap the second gate electrodes 124b.

A gate electrode 124a and 124b, a source electrode 173a and 173b, and a drain electrode 175a and 175b along with a projection 154 of a semiconductor stripe 151 form a TFT having a channel formed in the projection 154 disposed between the source electrode 173a and 173b and the drain electrode 175a and 175b.

The data lines 171 and the drain electrodes 175a and 175b are preferably include a conductive film made of Al containing metal such as Al and Al alloy, and they may have a multi-layered structure further including another conductive film preferably made of material such as Cr, Ti, Ta, Mo and alloys thereof (e.g., MoW alloy), which has good physical, chemical, and electrical contact characteristics with other materials such as indium tin oxide (ITO) or indium zinc oxide (IZO). An example of the combination of the two films is Cr and Al—Nd alloy. An Al containing conductive film of double layers is preferably disposed under another film, and an Al containing conductive film of triple layers is disposed between other two films.

Like the gate lines 121a and 121b, the data lines 171 and the drain electrodes 175a and 175b have tapered lateral sides relative to the surface of the substrate 110, and the inclination angles thereof range about 30-80 degrees.

The ohmic contacts 161 and 165 are interposed only between the underlying semiconductor stripes 151 and the overlying data lines 171 and the overlying drain electrodes 175a and 175b thereon and reduce the contact resistance therebetween. The semiconductor stripes 151 include a plurality of exposed portions, which are not covered with the data lines 171 and the drain electrodes 175a and 175b, such as portions located between the source electrodes 173a and 173b and the drain electrodes 175a and 175b. Although the semiconductor stripes 151 are narrower than the data lines 171 at most places, the width of the semiconductor stripes 151 becomes large near the gate lines 121a and 121b as described above, to enhance the insulations between.

A passivation layer 180 is formed on the data lines 171 and the drain electrodes 175a and 175b. The passivation layer 180 may be made of photosensitive organic material having a good flatness characteristic, low dielectric insulating material such as a-Si:C:O and a-Si:O:F formed by plasma enhanced chemical vapor deposition (PECVD), or inorganic material such as silicon nitride.

A plurality of first and second pixel electrodes 190a and 190b are formed on the passivation layer 180. The pixel electrodes 190a and 190b are connected to the drain electrodes 175a and 175b through the contact holes 185a and 185b provided at the passivation layer 180. The low dielectric organic passivation layer 180 having a dielectric constant lower than 4.0 allows the overlap of the edges of the pixel electrodes 190a and 190b and the data lines 171 to increase the aperture ratio of the pixels.

Contact assistants 82 are formed on the passivation layer 180 and they are connected to the end portions 179 of the data lines 171 through the contact holes 182. When the end portions of the gate lines 129 have a structure for connection with a driving circuit, gate contact assistants are formed on the passivation layer 180.

The contact assistants 82 protect the exposed portions 179 and complement the adhesion between the exposed portions 179 and external devices.

However, the gate driving circuit may be formed on the substrate 110 along with the TFTs, and in this case, the gate lines 121 and the TFTs are connected to each other such that the contact assistants are not required.

The contact assistants 82 protect the exposed portions 179 and complement the adhesion between the exposed portions 179 and external devices, but it is optional.

In this embodiment, the first pixel electrode 190a connected to the first drain electrode 175a overlaps the second gate electrode 121b, and the second gate line 121b is supplied with a gate-off voltage Voff when the first gate line 121a is supplied with a gate-on voltage. Accordingly, the second gate line 121b serve as a storage electrode line that forms a storage capacitor along with the first drain electrode 175a. On the contrary, the first gate line 121a serve as a storage electrode line that forms a storage capacitor along with the second drain electrode 175a by applying the gate-on voltage to the second gate line 121b and applying the gate-off voltage to the first gate line 121a. That is, when the first gate line 121a is supplied with the gate-on voltage and the second gate line 121b is supplied with the gate-off voltage, a TFT disposed right to a data line 171 turns on and a TFT disposed left to the data line 171 turns off. When the gate lines 121a and 121b are supplied with opposite voltages, the TFTs also turns on/off in an opposite manner.

As a result, sufficient storage capacitances are obtained without providing a separate storage electrode line or storage electrode such that there is no decrease in aperture ratio.

Now, a method of manufacturing a TFT array panel for an LCD is described with reference to FIGS. 3-8b as well as FIGS. 1 and 2.

Figure 3:
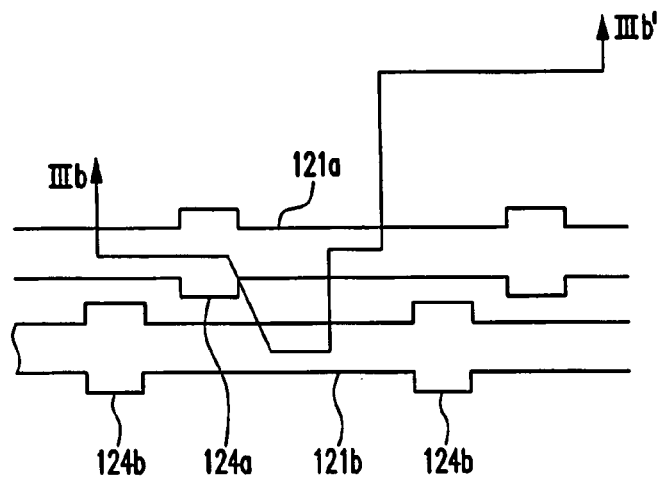
FIGS. 3, 5, 7 and 9 are layout views of the TFT array panel shown in FIGS. 1 and 2 in intermediate steps of a manufacturing method thereof according to an embodiment of the present invention.
Figure 3:
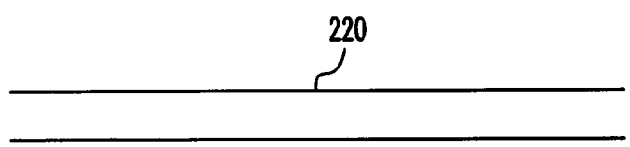
Figure 3:
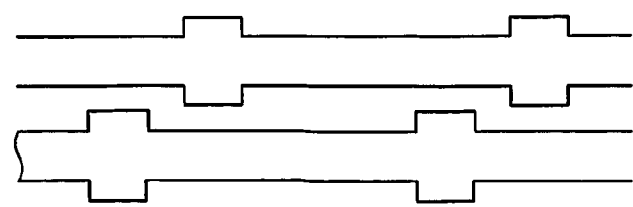
Figure 4:
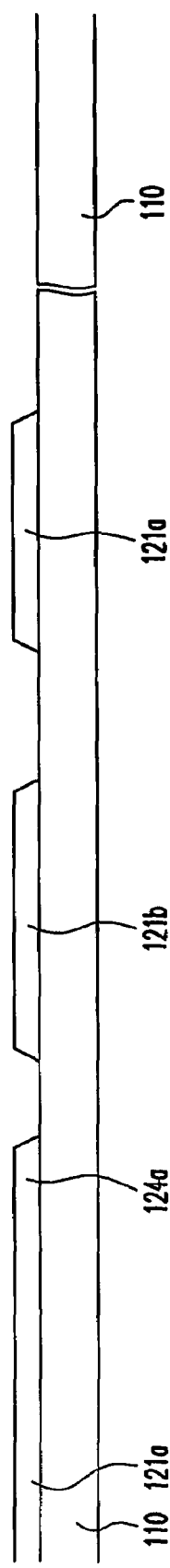
FIG. 4 is a sectional view of the TFT array panel shown in FIG. 3 taken along the line IIIb-IIIb'.
Figure 5:
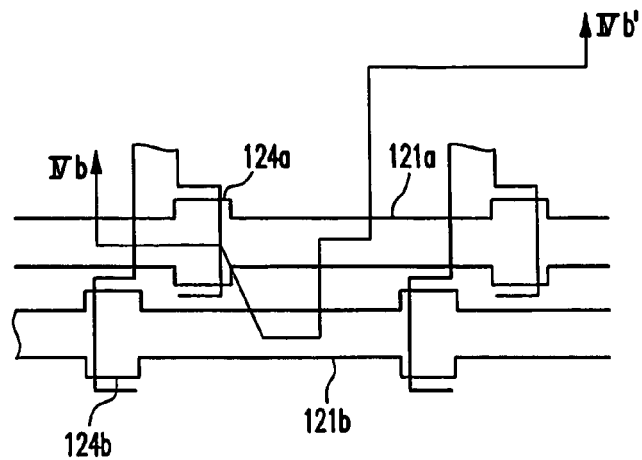
Figure 5:
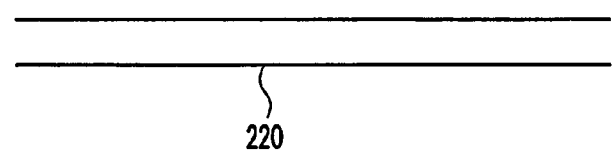
Figure 5:
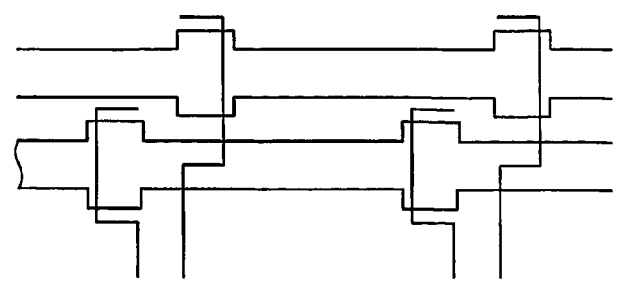
Figure 6:
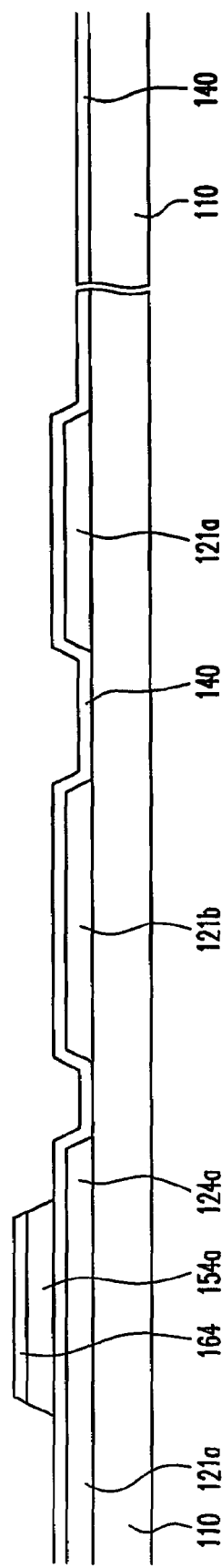
FIG. 6 is a sectional view in a step following the step shown in FIG. 4.
Figure 7:
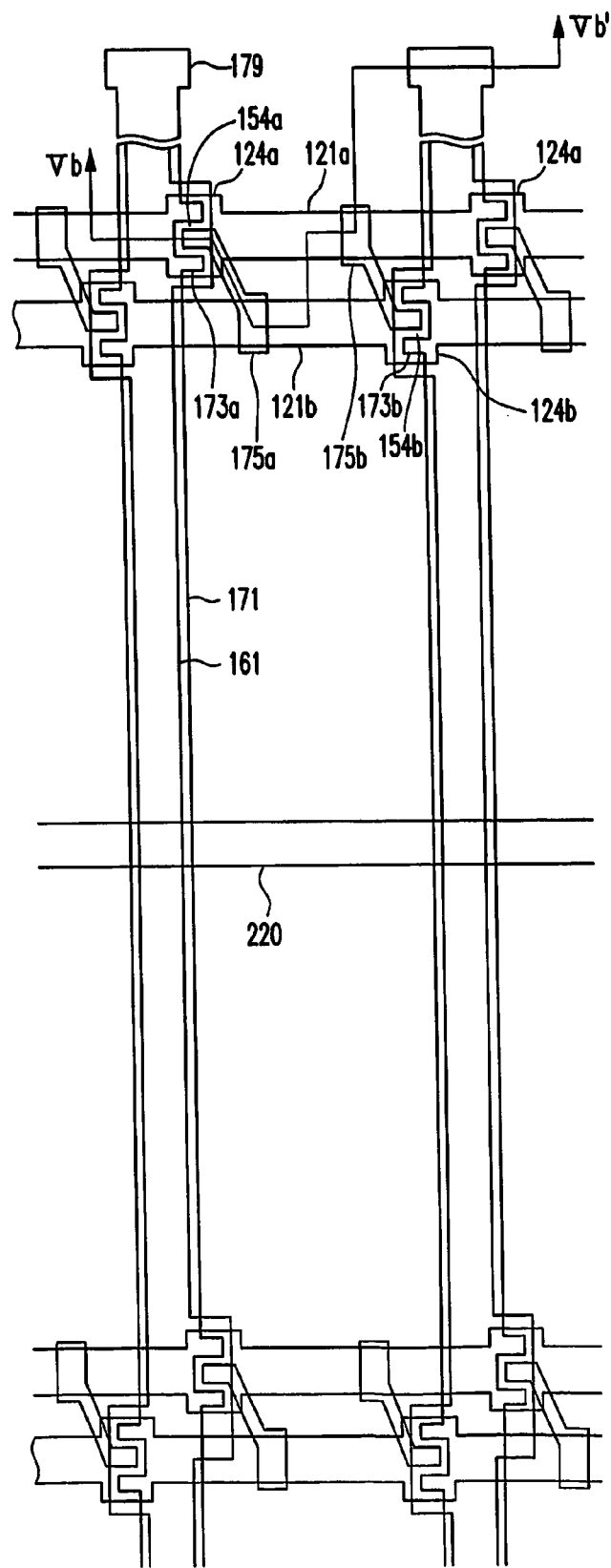
Figure 8:
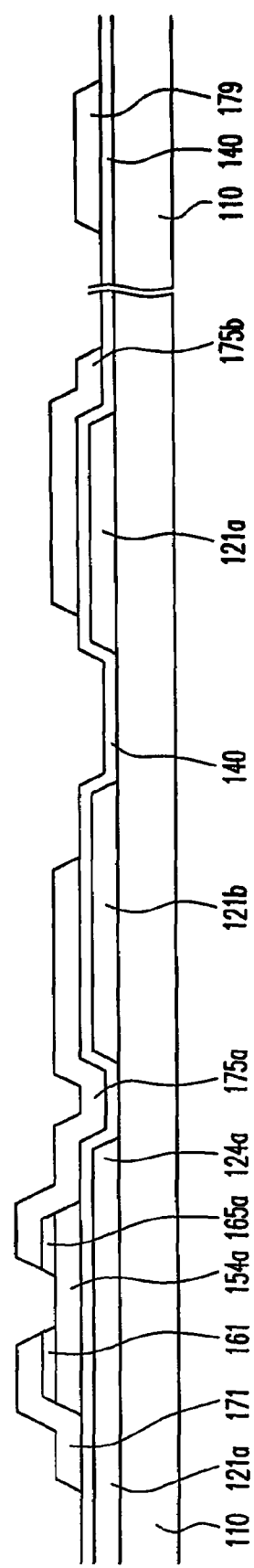
FIG. 8 is a sectional view in a step following the step shown in FIG. 6.
Figure 9:
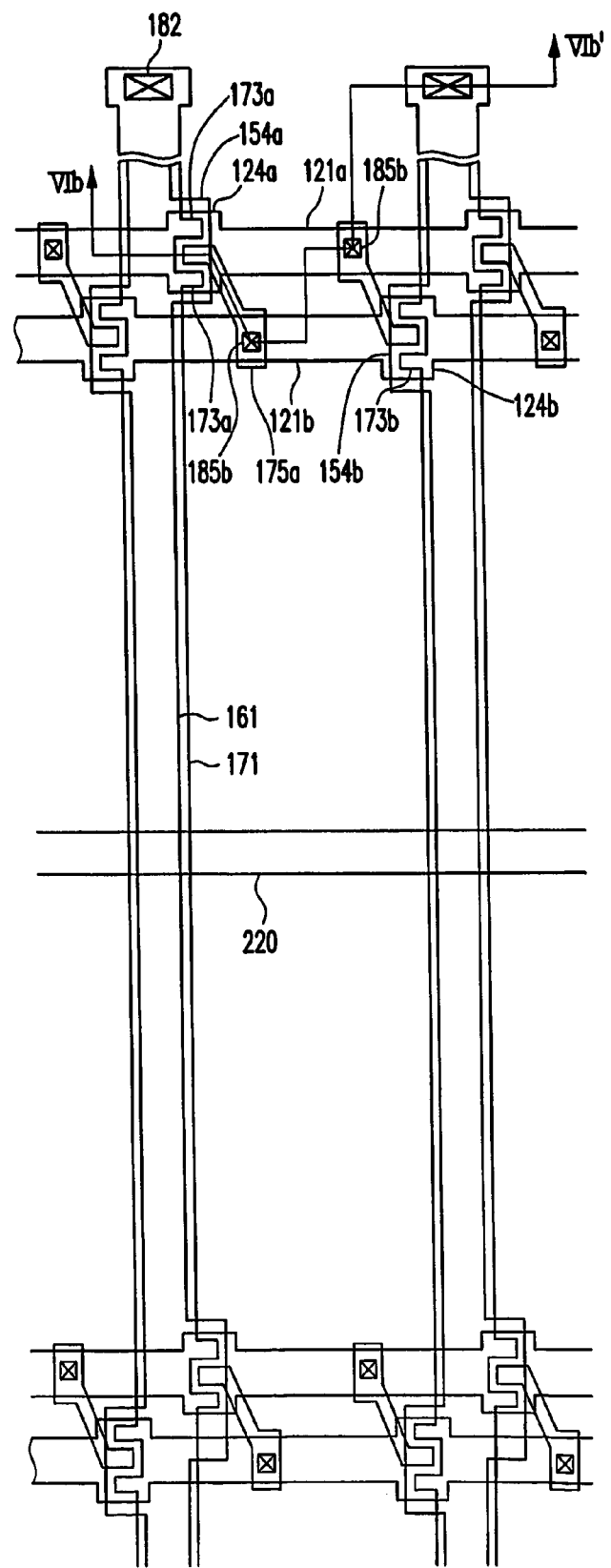
Figure 10:
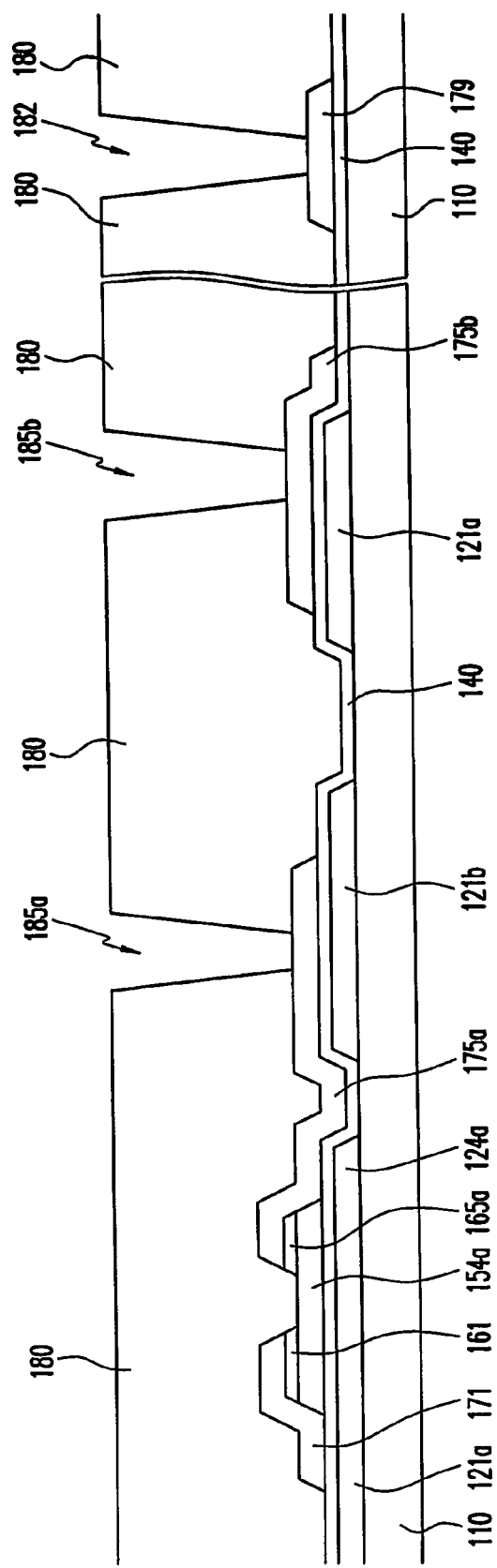
FIG. 10 is a sectional view in a step following the step shown in FIG. 6.

FIGS. 3, 5, 7 and 9 are layout views of the TFT array panel shown in FIGS. 1 and 2 in intermediate steps of a manufacturing method thereof according to an embodiment of the present invention, and FIG. 4 is a sectional view of the TFT array panel shown in FIG. 3 taken along the line IIIb-IIIb', FIG. 6 is a sectional view in a step following the step shown in FIG. 4, FIG. 8 is a sectional view in a step following the step shown in FIG. 6, and FIG. 10 is a sectional view in a step following the step shown in FIG. 6.

Referring to FIGS. 3 and 4, a conductive film having a signal layer or multi-layered structure is sputtered on an insulating substrate 110 such as transparent glass. The conductive film is wet or dry etched using photolithography with a mask to form gate lines 121a and 121b and light blocking members 220. The sidewalls thereof are inclined to give smooth profiles to following films.

Referring to FIGS. 7 and 8, after sequential deposition of a gate insulating layer 140 preferably made of silicon nitride or silicon oxide, an intrinsic a-Si layer, and an extrinsic a-Si layer on the gate lines 121a and 121b and the light blocking members 220, the extrinsic a-Si layer and the intrinsic a-Si layer are photo-etched to form a plurality of extrinsic semiconductor stripes 164 and a plurality of intrinsic semiconductor stripes 151 including a plurality of projections 154.

Referring to FIGS. 7 and 8, a conductive layer preferably made of the same material as the gate lines 121a and 121b is sputtered. A photoresist film is formed and the conductive layer is patterned using the photoresist as an etch mask to form a plurality of data lines 171 including a plurality of source electrodes 173a and 173b and a plurality of drain electrodes 175. Portions of the extrinsic semiconductor stripes 164, which are not covered with the data lines 171 and the drain electrodes 175a and 175b, are removed by etch to complete a plurality of ohmic contact stripes 161 including a plurality of projections 163 and a plurality of ohmic contact islands 165 and to expose portions of the intrinsic semiconductor stripes 151.

Referring to FIGS. 9 and 10, a passivation layer 180 made of inorganic material or low dielectric planarization organic material is coated to form a passivation layer 180.

The passivation layer 180 is photo-etched using a mask to form a plurality of contact holes 185a, 185b and 182 exposing the drain electrodes 175a and 175b and the end portions 179 of the data lines 171.

When the passivation layer 180 is made of photosensitive organic material, a step for forming a photoresist pattern can be omitted to simplify the manufacturing process.

Referring to FIGS. 1 and 2, a transparent conductive layer made of ITO or IZO is deposited on the substrate 110 and photo-etched with a mask to form a plurality of pixel electrodes 190a and 190b connected to the drain electrodes 175a and 175b and a plurality of contact assistants 82 connected to the end portions of the data lines 171 are formed on the passivation layer 180.

Second Embodiment

Unlike the above-described embodiment, color filters are formed on a TFT array panel for an LCD. A TFT array panel according to another embodiment of the present invention has a layered structure that is equivalent to the embodiment shown in FIGS. 1 and 2 as shown in FIGS. 11 and 12.

Figure 11:
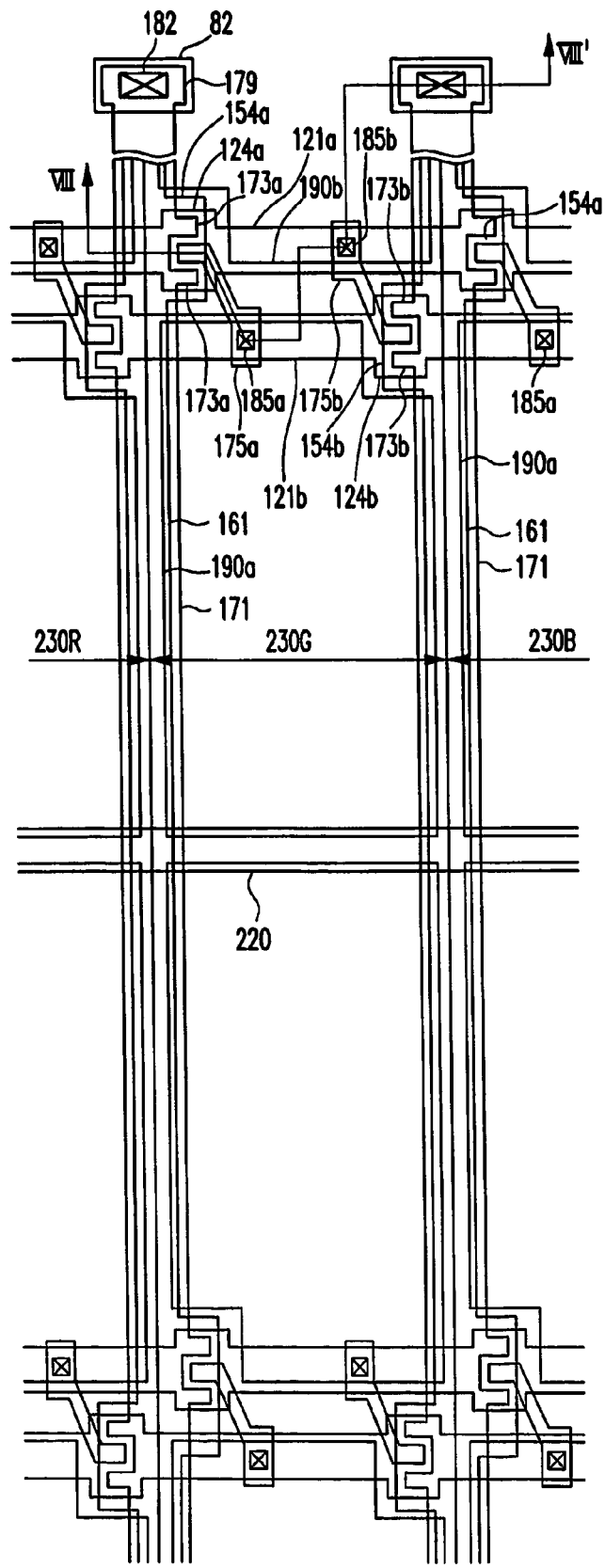
FIG. 11 is a layout view of a TFT array panel for an LCD according to another embodiment of the present invention.
Figure 12:
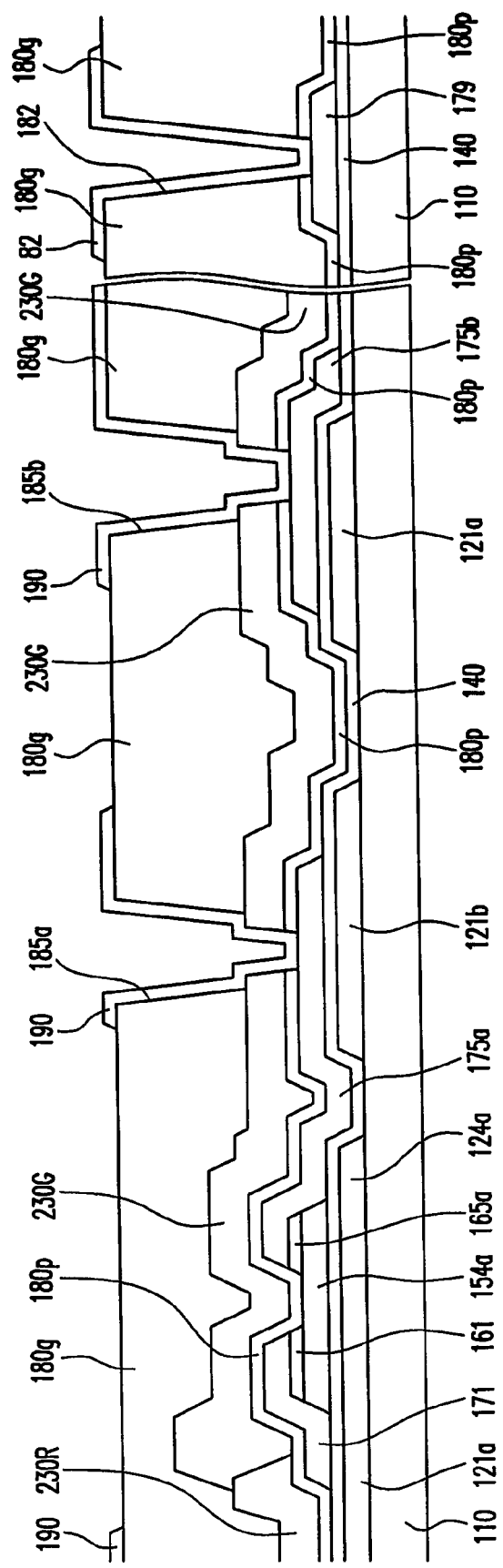
FIG. 12 is a sectional view of the TFT array panel shown in FIG. 4 taken along the line XII-XII'.

FIG. 11 is a layout view of a TFT array panel for an LCD according to another embodiment of the present invention, and FIG. 12 is a sectional view of the TFT array panel shown in FIG. 11 taken along the line XII-XII'.

Different from the TFT array panel shown in FIGS. 1 and 2, color filters 230R, 230G and 230B are formed on the passivation layer 180p. The passivation layer 180p is made of insulator such as silicon oxide or silicon nitride and it protects exposed portions of semiconductor 154 and prevents color agents from the color filters to another layer.

The color filters 230R, 230G and 230B include red, green and blue color filters 230R, 230G and 230B extending along pixel columns defined by the data lines 171 parallel to the data lines and arranged in turn.

The red, green and blue color filters 230R, 230G and 230B are not provided near the end portions of the gate lines 121 and the data lines 171 that are connected to external devices. The edges of the color filters 230R, 230G and 230B overlap each other on the data lines 171. The overlap of the color filters 230R, 230G and 230B blocks light leakage between the pixel areas, and all the red, green and blue color filters may overlap on the data lines 171.

An interlayer insulating layer 180q is formed on the color filters 230R, 230G and 230B. The interlayer insulating layer 180q prevents the pigments in the color filters 230R, 230G and 230B from being introduced into the pixel electrodes 190. The interlayer insulating layer 180q is optional.

The color filters 230R, 230G and 230B on the TFT array panel allow the black matrix to be placed at the TFTs, thereby increasing the aperture ratio.

Referring to FIG. 13-16, a method of manufacturing the TFT array panel according to this embodiment will be described in detail.

Figure 13:
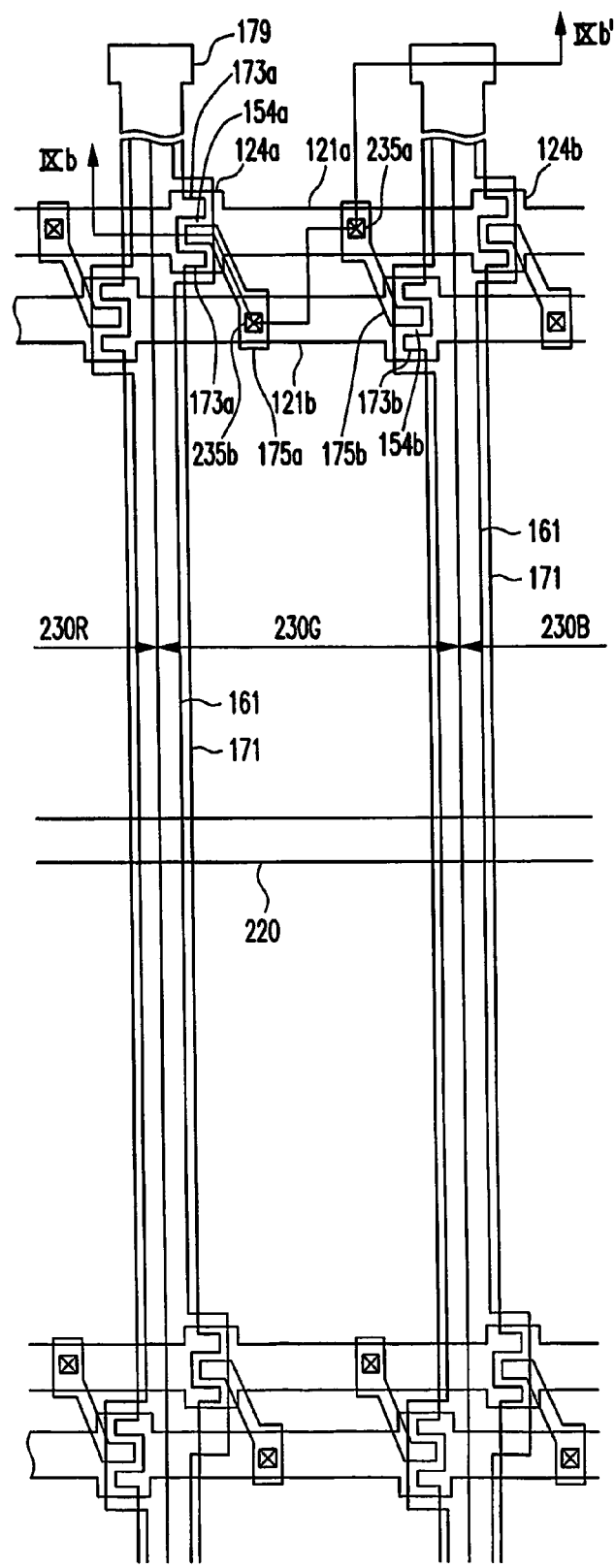
FIGS. 13 and 15 are layout views of the TFT array panel in intermediate steps of a manufacturing method thereof according to a second embodiment of the present invention.
Figure 14:
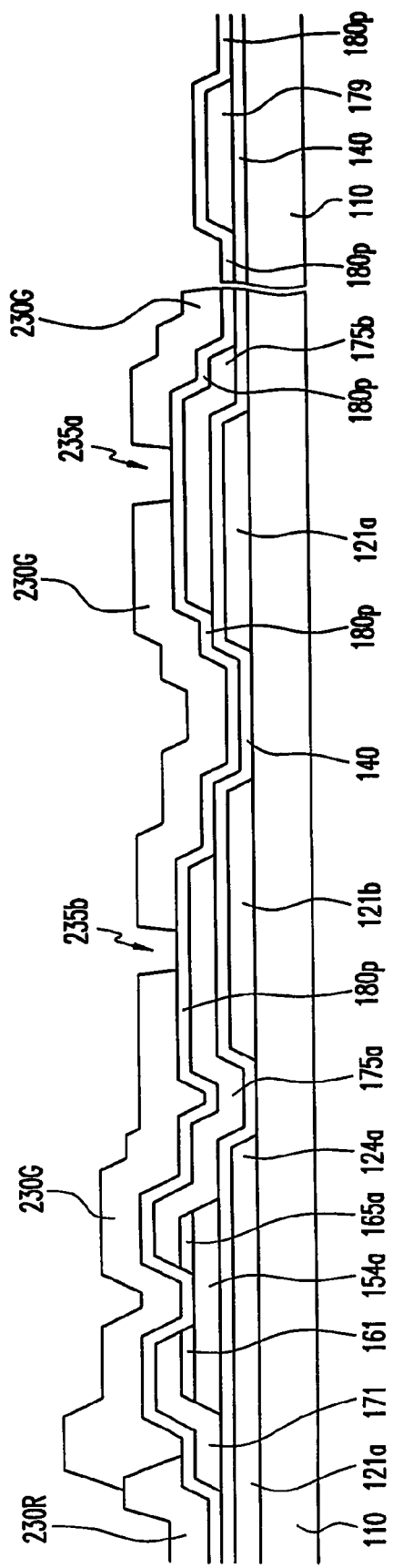
FIG. 14 is a sectional view of the TFT array panel shown in FIG. 13 taken along the line IXb-IXb'.
Figure 15:
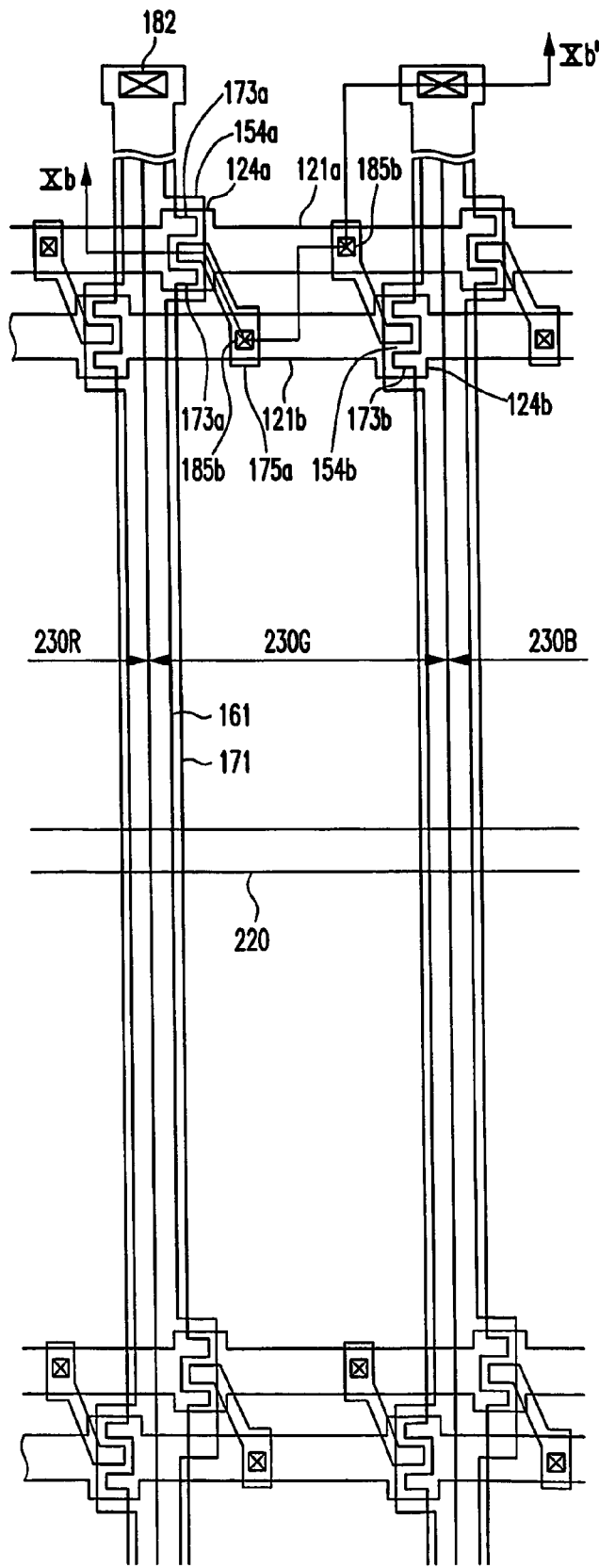
Figure 16:
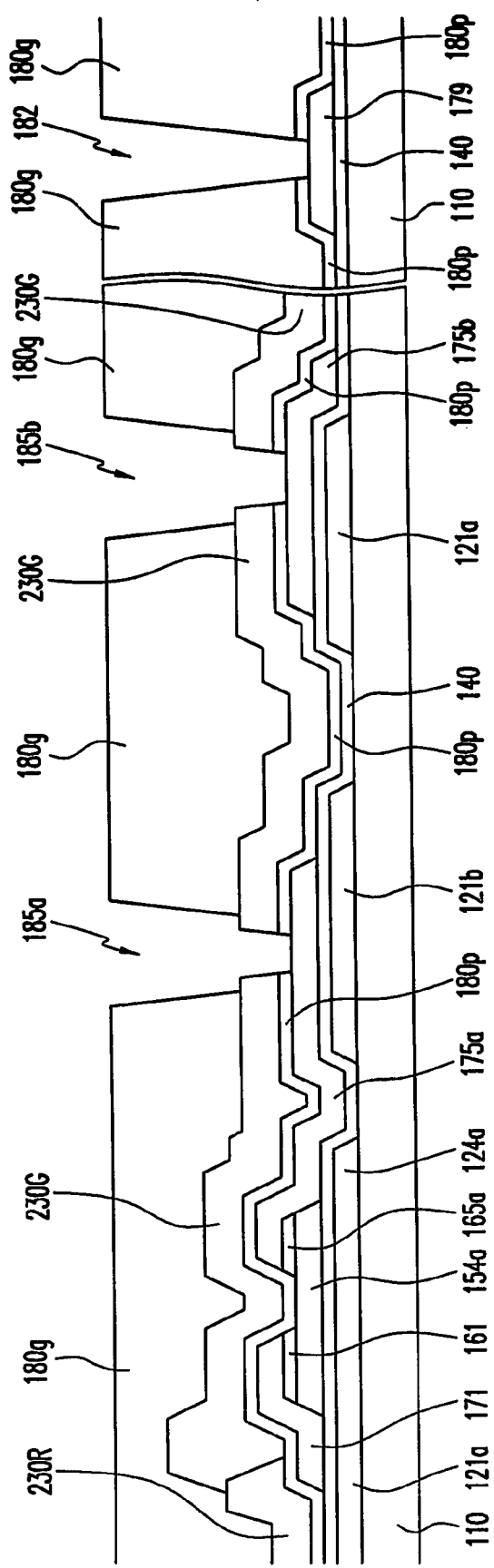
FIG. 16 is a sectional view the TFT array panel shown in FIG. 13 taken along the line X-X'.

FIGS. 13 and 15 are layout views of the TFT array panel in intermediate steps of a manufacturing method thereof according to a second embodiment of the present invention, and FIG. 14 is a sectional view of the TFT array panel shown in FIG. 13 taken along the line IXb-IXb', and FIG. 16 is a sectional view the TFT array panel shown in FIG. 13 taken along the line X-X'.

Referring to FIGS. 3-8 of the first embodiment, gate lines 121a and 121b, a gate insulating layer 140, semiconductors 151 and 154, ohmic contacts 161 and 165, data lines 171, and drain electrodes 175a and 175b.

Referring to FIGS. 13 and 14, a passivation layer 180p is formed by depositing inorganic insulator such as silicon oxide and silicon nitride. The color filters 230R, 230G, and 230B are formed on the passivation layer 180p by coating, exposing, and developing a photosensitive film including red, green and blue pigments.

The openings 235 corresponding to the drain electrodes 175 are formed when the red, green, and blue color filters 230R, 230G and 230B using photolithography with a mask.

Referring to FIGS. 15 and 16, an interlayer insulating layer 180q is formed on the color filters 230R, 230G and 230B by coating a low dielectric material having dielectric constant lower than 4.0.

The interlayer insulating layer 180q is photo-etched using a mask to form a plurality of contact holes 185 and 182 exposing the openings 235 and the end portions 179 of the data lines 171. The formation of the contact holes is performed in the same manner as the first embodiment.

Referring to FIGS. 11 and 12, a transparent conductive layer made of ITO or IZO is deposited on the substrate 110 and photo-etched with a mask to form a plurality of pixel electrodes 190 connected to the drain electrodes 175 and a plurality of contact assistants 82 connected to the end portions of the data lines 171 are formed on the passivation layer 180.

Third Embodiment

The different thin films except for the color filters on the TFT array panel according to the above-described embodiments are formed by a photoresist film, which will be described in detail with reference to the drawings.

Figure 17:
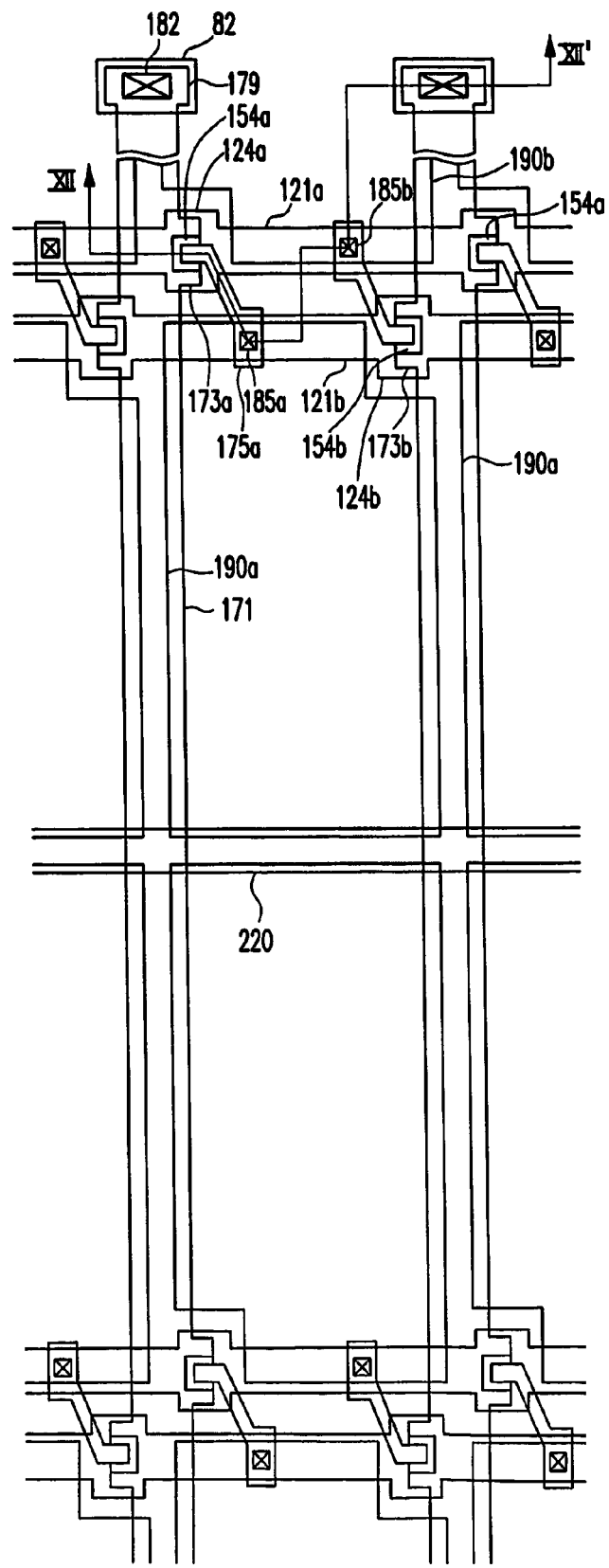
FIG. 17 is a layout view of a TFT array panel for an LCD according to another embodiment of the present invention.
Figure 18:
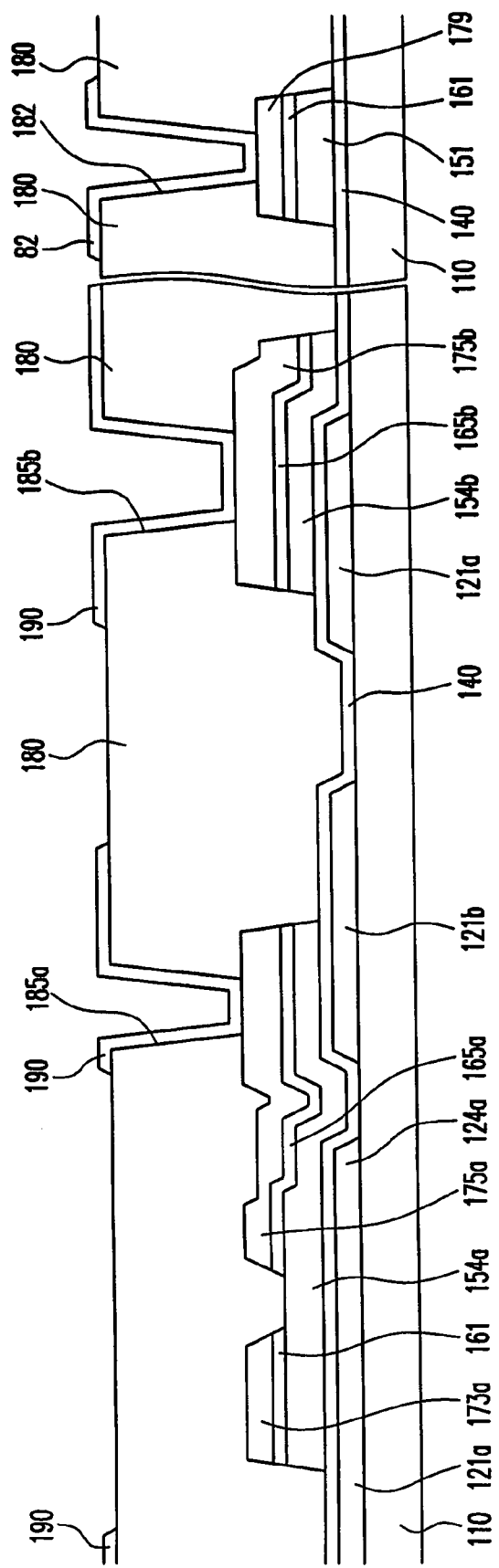
FIG. 18 is a sectional view of the TFT array panel shown in FIG. 17 taken along the line XII-XII'.
Figure 19:
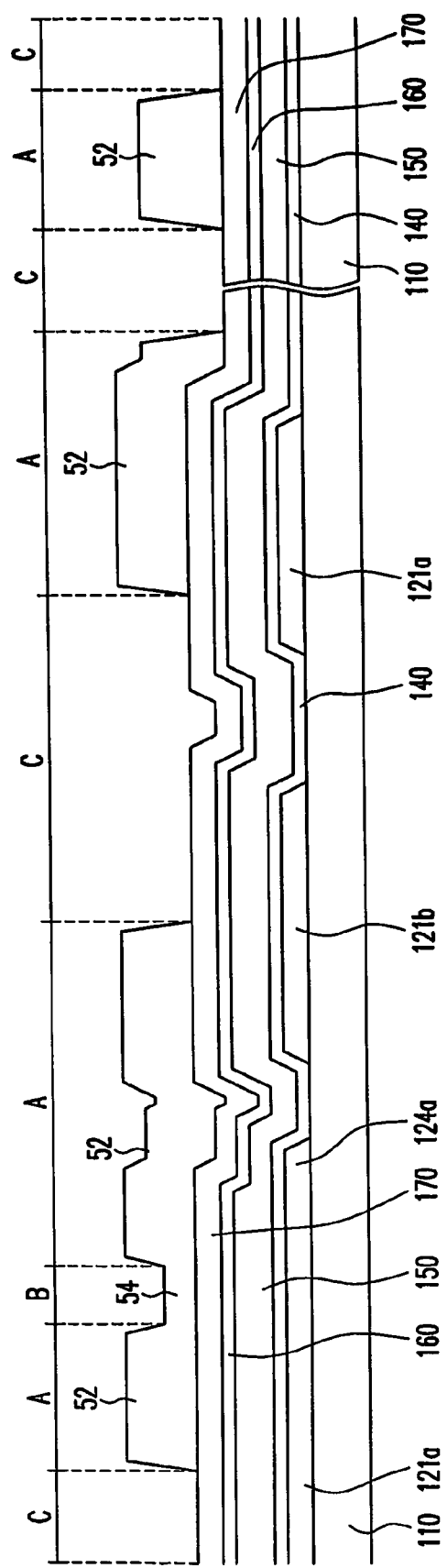
FIGS. 19 is a sectional view of the TFT array panel shown in FIGS. 17 and 18 in an intermediate step of a manufacturing method thereof according to an embodiment of the present invention.
Figure 20:
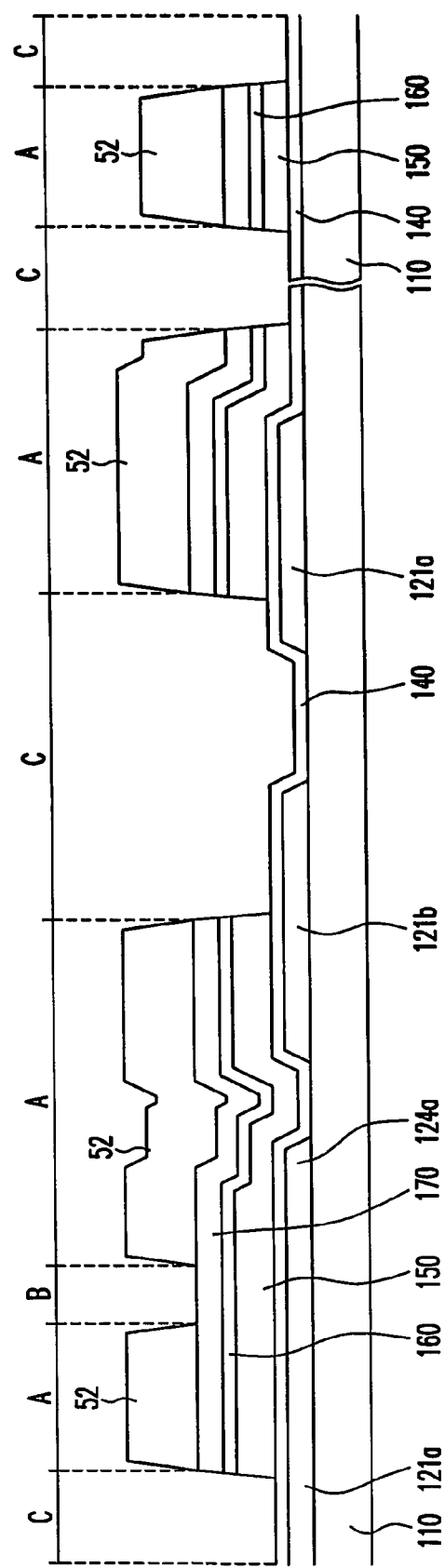
FIG. 20 is a sectional view in a step following the step shown in FIG. 19.
Figure 21:
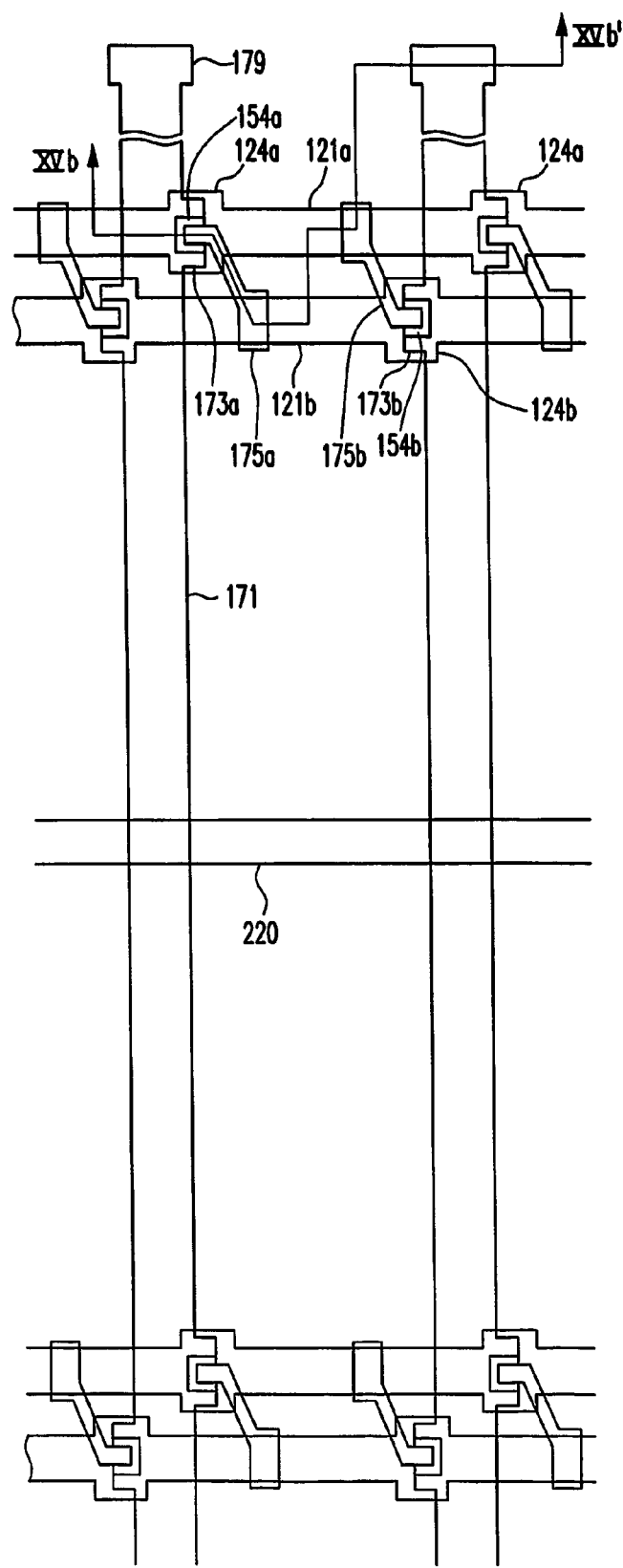
FIG. 21 is a layout view in a step following the step shown in FIG. 20.
Figure 22:
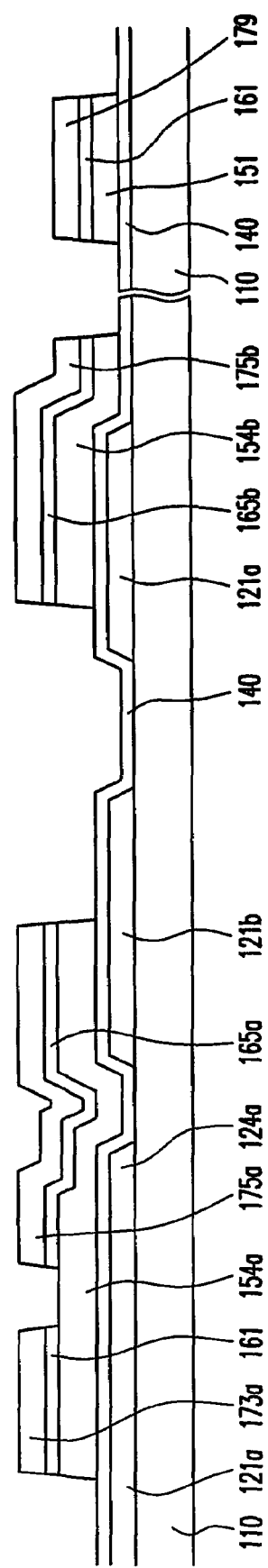
FIG. 22 is a sectional view of the TFT array panel shown in FIG. 21 taken along the line XVb-XVb'.
Figure 23:
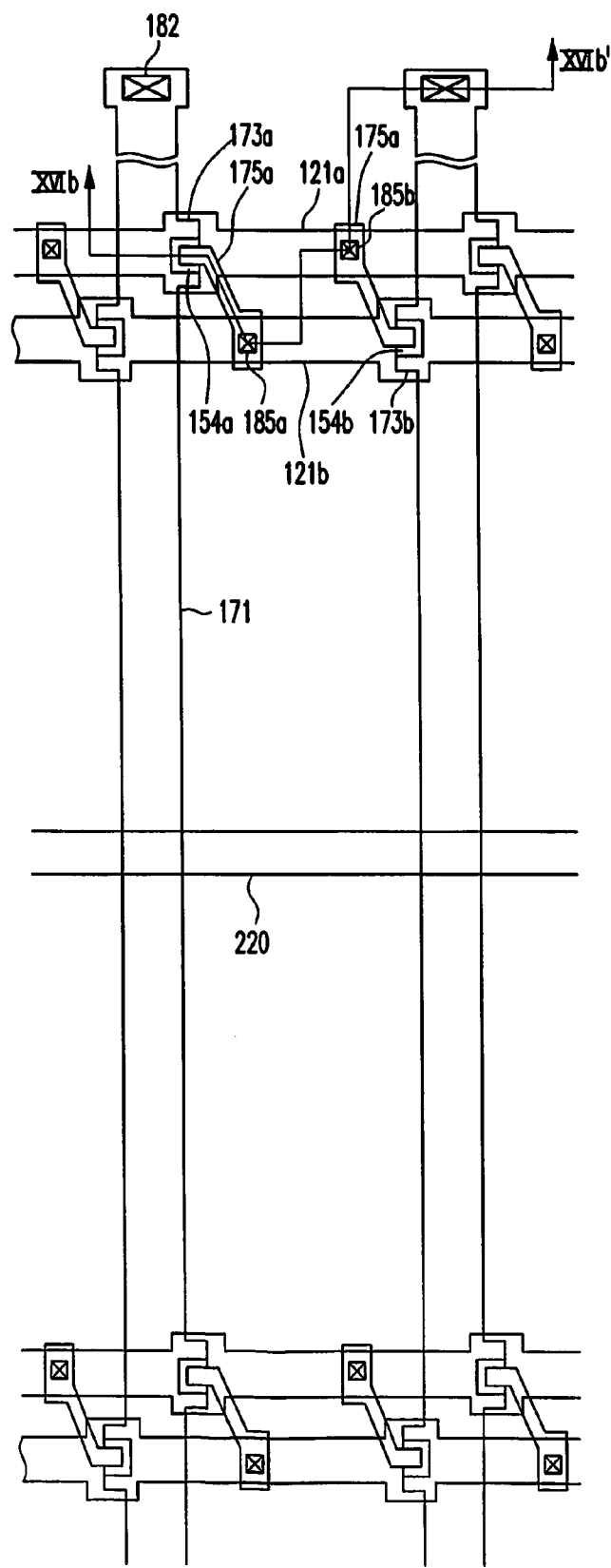
FIG. 23 is a layout view in a step following the step shown in FIG. 21.
Figure 24:
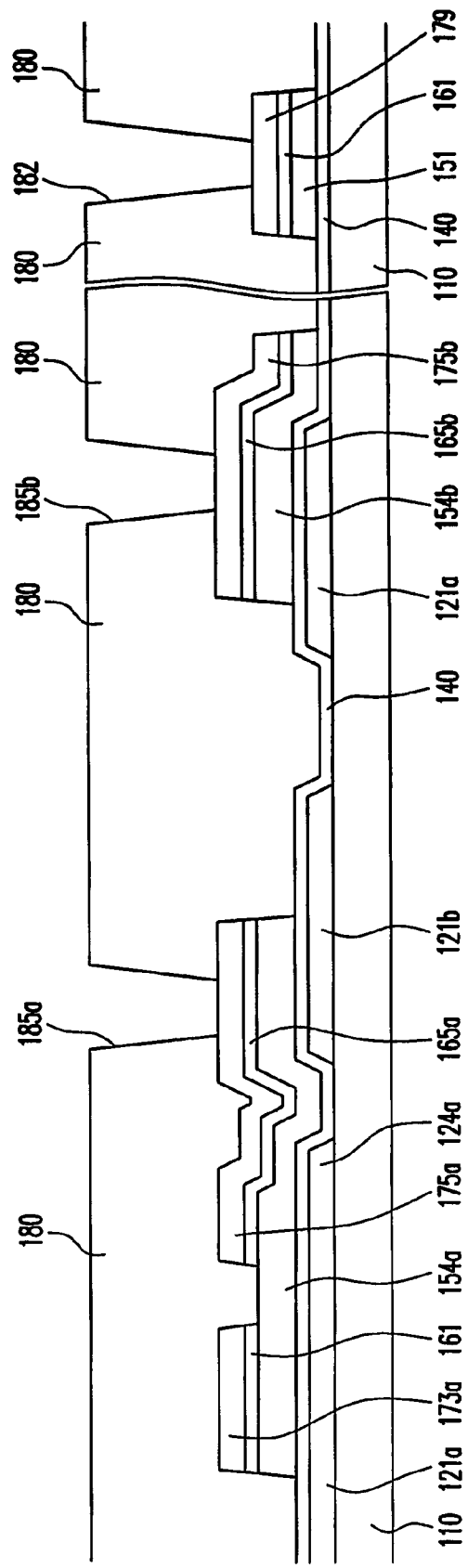
FIG. 24 is a sectional view of the TFT array panel shown in FIG. 23 taken along the line XVIb-XVIb'.

FIG. 17 is a layout view of a TFT array panel for an LCD according to another embodiment of the present invention, and FIG. 18 is a sectional view of the TFT array panel shown in FIG. 17 taken along the line XII-XII'. FIGS. 19 is a sectional view of the TFT array panel shown in FIGS. 17 and 18 in an intermediate step of a manufacturing method thereof according to an embodiment of the present invention, FIG. 20 is a sectional view in a step following the step shown in FIG. 19, FIG. 21 is a layout view in a step following the step shown in FIG. 20, FIG. 22 is a sectional view of the TFT array panel shown in FIG. 21 taken along the line XVb-XVb', FIG. 23 is a layout view in a step following the step shown in FIG. 21, and FIG. 24 is a sectional view of the TFT array panel shown in FIG. 23 taken along the line XVIb-XVIb'.

Referring to FIGS. 17 and 18, a structure of a TFT array panel is described in detail.

Referring to FIGS. 17 and 18, the TFT array panel according this embodiment includes no color filter. However, other configurations of the TFT array panel are the same as that shown in FIGS. 1 and 2. That is, a plurality of gate lines 121a and 121b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175a and 175b are formed on the ohmic contacts 161 and 165, and a passivation layer 180 are formed thereon. A plurality of contact holes 182 and 185 are provided at the passivation layer 180, and a plurality of pixel electrodes 190 and a plurality of contact assistants 82 are formed on the passivation layer 180. In addition, the TFT array panel may include color filters like the second embodiment.

Different from the TFT array panel shown in FIGS. 1 and 2, the semiconductor stripes 151 of the TFT array panel according to this embodiment have almost the same planar shapes as the data lines 171 and the drain electrodes 175a and 175b as well as the underlying ohmic contacts 161 and 165. However, the projections 154 of the semiconductor stripes 151 include some exposed portions, which are not covered with the data lines 171 and the drain electrodes 175a and 175b, such as portions located between the source electrodes 173a and 173b and the drain electrodes 175a and 175b.

Now, a method of manufacturing the TFT array panel shown in FIGS. 17 and 18 according to an embodiment of the present invention will be described in detail with reference to FIGS. 3,4 and 17-24.

Referring to FIGS. 3 and 4, a conductive film having a signal layer or multi-layered structure and preferably made of Cr, Mo, Al, Al or alloys thereof is sputtered on an insulating substrate 110 such as transparent glass. The conductive film is wet or dry etched using photolithography with a mask to form gate lines 121a and 121b and light blocking members 220. The sidewalls thereof are inclined to give smooth profiles to following films.

Next, a gate insulating layer 140 preferably made of silicon nitride, an intrinsic a-Si layer 150, and an extrinsic a-Si layer 160 are sequentially deposited by CVD.

A conductive layer 170 having a signal layer or multi-layered structure and made of Al, Ag, Cr, Mo or alloy thereof is deposited by sputtering, and a photoresist pattern 52 and 54 having different thickness is coated on the conductive layer 170.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist PR enables to selectively etch the underlying layers when using suitable process conditions. Therefore, a plurality of data lines 171 including a plurality of source electrodes 173a and 173b, and a plurality of drain electrodes 175a and 175b as well as a plurality of ohmic contact stripes 161 including a plurality of projections 163, a plurality of ohmic contact islands 165 and a plurality of semiconductor stripes 151 including a plurality of projections 154 are obtained by a series of etching steps as shown in FIGS. 12A and 12B. In FIGS. 12A and 12B, the lower and the upper films of the drain electrodes 171 are indicated by reference numerals 711 and 712, respectively, the lower and the upper films of the source electrodes 173a and 173b are indicated by reference numerals 731 and 732, respectively, the lower and the upper films of the drain electrodes 175a and 175b are indicated by reference numerals 751 and 752, respectively, and the lower and the upper films of the end portions 179 of the data lines 171 are indicated by reference numerals 791 and 792, respectively.

For descriptive purpose, portions of the conductive layer 170, the extrinsic a-Si layer 160, and the intrinsic a-Si layer 150 on the wire areas are called first portions, portions of the conductive layer 170, the extrinsic a-Si layer 160, and the intrinsic a-Si layer 150 on the channel areas are called second portions, and portions of the conductive layer 170, the extrinsic a-Si layer 160, and the intrinsic a-Si layer 150 on the third areas are called third portions.

An exemplary sequence of forming such a structure is as follows:

(1) Removal of third portions of the conductive layer 170, the extrinsic a-Si layer 160 and the intrinsic a-Si layer 150 on the wire areas;

(2) Removal of the second portions of the photoresist;

(3) Removal of the second portions of the conductive layer 170 and the extrinsic a-Si layer 160 on the channel areas; and (4) Removal of the first portions of the photoresist.

Another exemplary sequence is as follows:

(1) Removal of the third portions of the conductive layer 170;

(2) Removal of the second portions of the photoresist;

(3) Removal of the third portions of the extrinsic a-Si layer 160 and the intrinsic a-Si layer 150;

(4) Removal of the second portions of the conductive layer 170;

(5) Removal of the first portions of the photoresist; and (6) Removal of the second portions of the extrinsic a-Si layer 160.

The first example is described in detail.

Referring to FIG. 20, the exposed third portions of the conductive layer 170 on the third areas are removed by wet etching or dry etching to expose the underlying third portions of the extrinsic a-Si layer 160. The dry etching may etch out the top portions of the photoresist PR.

Next, the third portions of the extrinsic a-Si layer 160 on the third areas and of the intrinsic a-Si layer 150 are removed preferably by dry etching and the second portions of the photoresist PR are removed to expose the second portions of the conductors 170. The removal of the second portions of the photoresist PR are performed either simultaneously with or independent from the removal of the third portions of the extrinsic a-Si layer 160 and of the intrinsic a-Si layer 150 Residue of the second portions of the photoresist PR remained on the channel areas is removed by ashing.

The semiconductor stripes 151 are completed in this step.

If the conductive layer 170 is dry etchable, it may be sequentially dry-etched along with the extrinsic a-Si layer 160 and the intrinsic a-Si layer 150 to simplify the manufacturing process. In this case, the dry etch for the three layers may be performed in-situ or not.

Next, referring to FIGS. 21 and 22, the second portions of the conductors 170 and the extrinsic a-Si layer 160 on the channel areas as well as the first portion of the photoresist PR are removed.

The tope portions of the semiconductor 151 may be subjected to thickness reduction, and the photoresist 52 may be etched.

In this way, each conductor 170 is divided into a data line 171 and a plurality of drain electrodes 175a and 175b to be completed, and the extrinsic a-Si layer 160 is divided into an ohmic contact stripe 161 and a plurality of ohmic contact islands 165 to be completed.

The data lines 171 and the drain electrodes 175a and 175b may be also tapered to enhance the attachment of the overlying layer.

Referring to FIGS. 23 and 24, a passivation layer 180 made of silicon nitride or silicon oxide is deposited to cover the data lines 171 and the drain electrodes 175a and 175b.

The passivation layer 180 is photo-etched using a mask to form a plurality of contact holes 185a and 185b exposing portions of the drain electrodes 175a and 175b and contact holes 182 portions of the expansions 179 of the data lines 171.

Referring to FIGS. 17 and 18, a transparent conductive layer made of ITO or IZO is deposited on the substrate 110 and photo-etched with a mask to form a plurality of pixel electrodes 190a and 190b connected to the drain electrodes 175a and 175b and a plurality of contact assistants 82 connected to the end portions of the data lines 171 are formed on the passivation layer 180.

As described above, when a gate line is supplied with a gate-on voltage, another gate line is supplied with a gate-off voltage to form a storage capacitor. As a result, sufficient storage capacitances are obtained without providing a separate storage electrode line or storage electrode such that there is no decrease in aperture ratio.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor ("TFT") array panel comprising:
    first and second gate lines transmitting gate signals to adjacent pixel electrodes and disposed adjacent to each other;
    a data line insulated from the first and the second gate lines;
    a first thin film transistor connected to the first gate line and the data line, and including a first drain electrode overlapping the second gate line;
    a second thin film transistor connected to the second gate line and the data line, disposed opposite the first thin film transistor with respect to the data line, and including a second drain electrode overlapping the first gate line;
    a first pixel electrode connected to the first drain electrode and overlapping the second gate line; and
    a second pixel electrode connected to the second drain electrode and overlapping the first gate line.

2. The TFT array panel of claim 1, further comprising red, green or blue color filters disposed in a pixel area defined by intersections of the first and the second gate lines and the data line.

3. The TFT array panel of claim 1, wherein the first and the second TFTs comprise:
    first and second gate electrodes connected to the first and the second gate lines, respectively;
    first and second semiconductors overlapping the first and the second gate electrodes, respectively; and
    first and second source electrodes connected to the data line and overlapping the first and the second semiconductors, respectively.

4. The TFT array panel of claim 2, wherein the first and the second TFTs comprise:
    first and second gate electrodes connected to the first and the second gate lines, respectively;
    first and second semiconductors overlapping the first and the second gate electrodes, respectively; and
    first and second source electrodes connected to the data line and overlapping the first and the second semiconductors, respectively.

5. The TFT array panel of claim 4, further comprising a passivation layer interposed between the first and the second TFTs and the first and the second pixel electrodes and including organic insulator or inorganic insulator.

6. The TFT array panel of claim 5, wherein the passivation layer includes a first and a second contact holes exposing the first and the second drain electrodes, and the first and the second pixel electrodes are connected to the first and the second drain electrodes through the contact holes.

7. The TFT array panel of claim 6, wherein the first contact hole overlaps the second gate line and the second contact hole overlaps the first gate line.

8. The TFT array panel of claim 1, wherein the first pixel electrode does not overlap the first gate line, and the second pixel electrode does not overlap the second gate line.

9. The TFT array panel of claim 1, wherein the first and the second pixel electrodes overlap the data line.

* * * * *